UNITED STATES PATENT OFFICE.

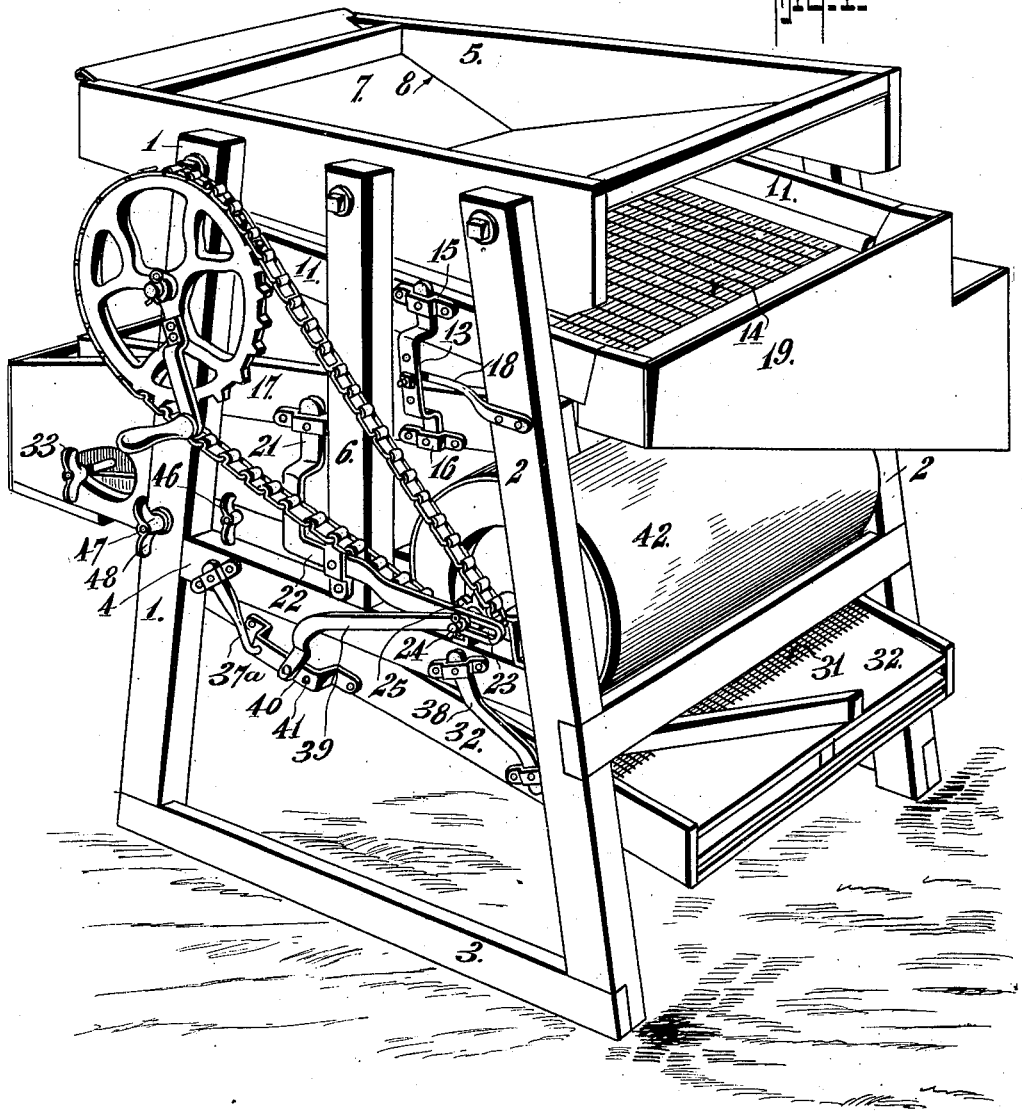

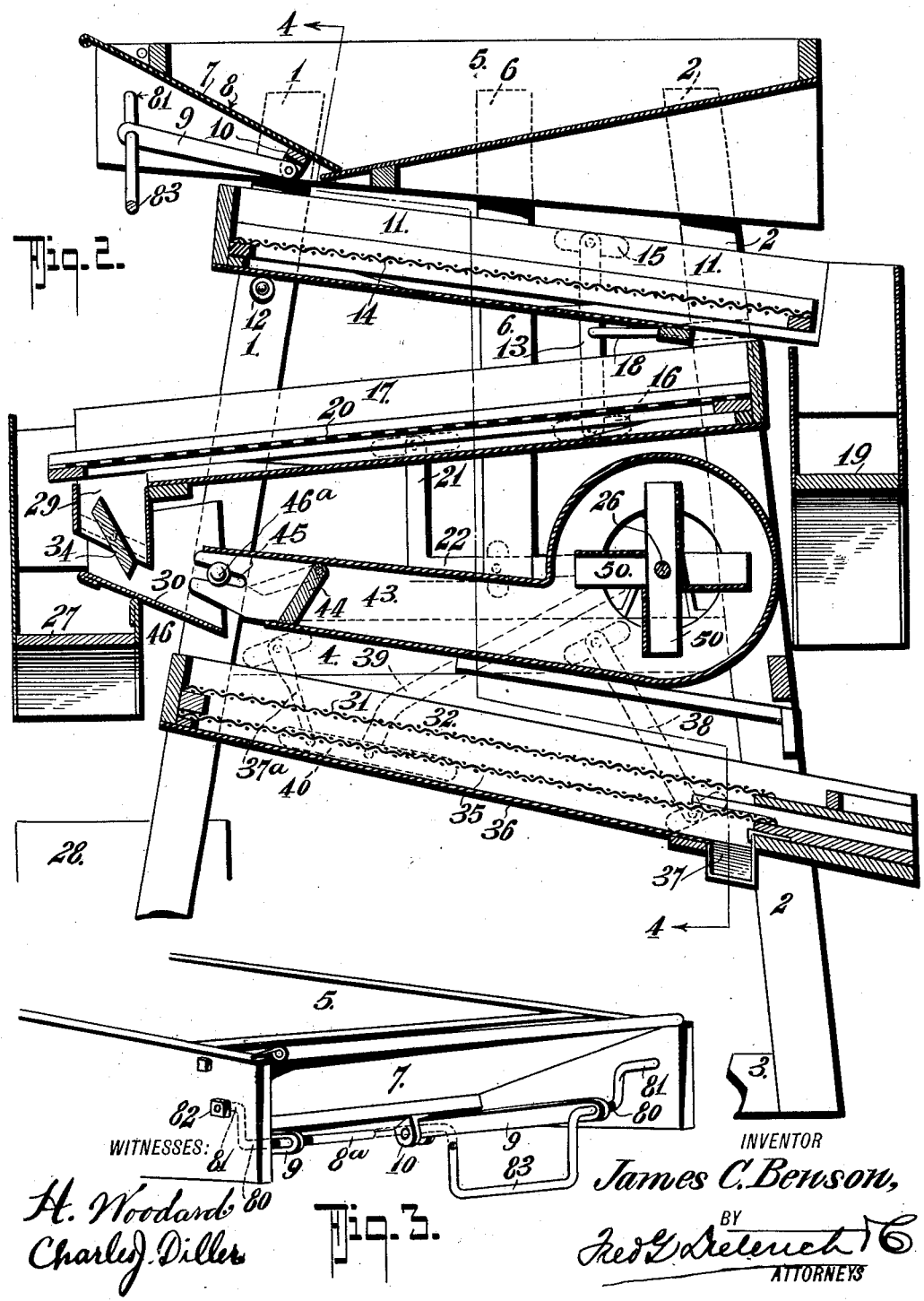

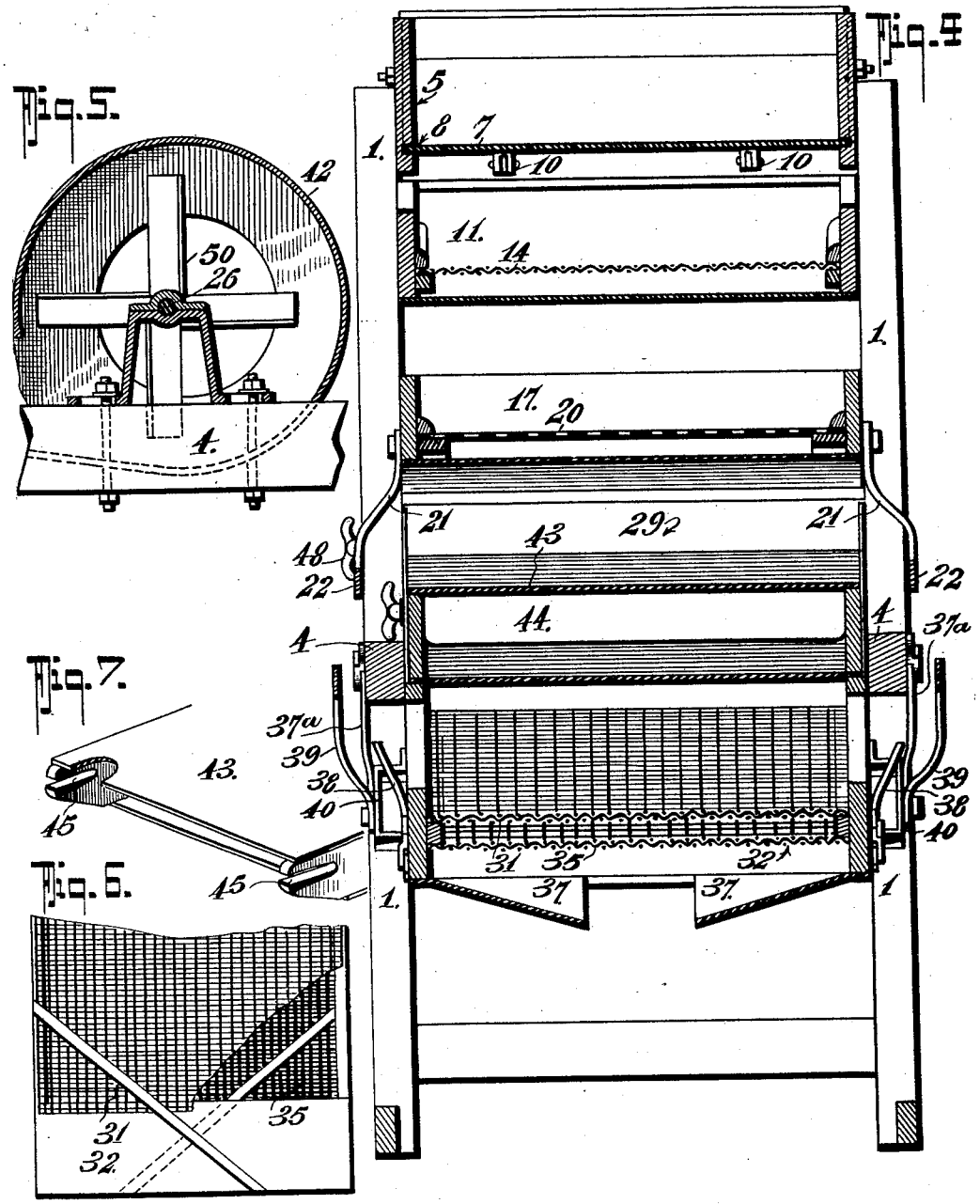

JAMES C. BENSON, OF INDIANAPOLIS, INDIANA.

SEED-CLEANER AND CORN-GRADER.

1,091,275. Specification of Letters Patent. Patented Mar. 24, 1914.

Application filed August 6, 1913. Serial No. 783,375.

*To all whom it may concern:*

Be it known that I, JAMES C. BENSON, at present residing at Indianapolis, in the county of Marion and State of Indiana, have invented a new and Improved Seed-Cleaner and Corn-Grader, of which the following is a specification.

My present invention, which relates generally to improvements in grain separating and cleaning machines, primarily has for its object to provide an improved machine of the general character noted in which the several parts are coöperatively combined and so designed whereby they can be conveniently made and assembled and adapted for effectively serving their intended purposes.

With other objects in view that will hereinafter appear, my present invention embodies the peculiar features of construction and novel arrangement of parts, all of which will be hereinafter fully explained, and specifically pointed out in the appended claims, reference being had to the accompanying drawings, in which:

Figure 1 is a perspective view of my improved machine. Fig. 2 is a vertical longitudinal section thereof. Fig. 3 is a detail perspective view of the hopper gate adjusting means. Fig. 4 is a transverse section of the machine taken on the line 4 on Fig. 2. Fig. 5 is a detail section of one of the adjustable yoke bearings for the driving shaft. Fig. 6 is a detail view of a part of the discharging end of the lowermost screen and shoe. Fig. 7 is a detail perspective of the fan casing.

In the practical arrangement, the supporting frame comprises a pair of front and a pair of rear end legs 1—1 and 2—2 joined by the base members 3—3 and the horizontal or cross bars 4—4.

5 designates the hopper which is supported between the upper ends of the front and rear pairs of legs bolted to the sides of the hopper, and the said hopper is further supported between the upper ends of a pair of uprights 6 that rise from the cross bars 4—4, as shown. In my present machine, the hopper 5 is fixedly held and one portion of its bottom is in the nature of a slidable gate 7, the edges of which ride in grooves 8—8 in the hopper sides, as is best shown in Fig. 4.

For conveniently adjusting the slidable bottom or gate 7, and for positively holding it to its shifted positions without the use of special clamping or locking devices, I utilize the means best shown in Fig. 3, by reference to which it will be noticed the same consists of a cross rod 8ª, the ends of which terminate in upwardly projected crank portions 80, the members 81 of which are rockably mounted in the opposite sides of the hopper frame and are held thereon by nuts 82. Rod 8ª is also bent up to form a downwardly projected crank handle 83.

9—9 are link bars, the inner ends of which are pivotally joined to bifurcated brackets 10 on the underside of the gate 7, and the outer ends thereof are pivotally connected with the cross rod 8ª, as shown.

By reason of the peculiar construction of the gate shifting devices, as described and shown, by manipulating the hand crank 83 of the rod 8ª, the links 9—9 cause the gate 7 to move to the open or closed positions, according to the way the crank member 83 is turned, and to be held to the adjusted positions, since through the manipulations of the said crank members 83 the links 9 become, as it were, spring levers, as is explained as follows: The link bars 9 are pivotally connected at their lower ends to the gate 7, their upper ends being connected to the member 8ª of the double crank rod, and by reason thereof, when the crank member 83 is turned upwardly the links 9—9 become "spring levers", and hold the gate to its shifted position. When the crank member 83 is turned forwardly it releases the spring levers or bars 9 and closes the gate 7. The crank member 83 operates as an adjustable fulcrum for the bars 9—9.

The upper shoe 11, in which is mounted the first or coarse mesh screen 14, is loosely supported at its upper end on the stud rollers 12—12 that are secured upon and extend inwardly from the upper ends of the legs 1—1. The lower end of the shoe 11 is adjustably supported on the oscillating arms 13—13, the upper ends of which are connected with brackets 15 on the sides of the shoe and the lower ends pivotally mounted on the brackets 16 mounted on the sides of the second or intermediate shoe 17, as is clearly shown in Fig. 1. By reference to Fig. 1, it will be seen that the oscillating arms 13 are fulcrumed midway their length on the bracket arms 18 which extend inwardly from the upper end of the legs 2.

The upper or chaff shoe 11, in my present machine, extends substantially the full length of the machine and it is sufficiently inclined to allow the chaff and like material to roll off into a receiver 19 in the nature of an inclined trough, that extends transversely of the front end of the machine and empties to one side thereof for discharging the said chaff etc. onto the floor. The grain or seed passes from the top screen onto the second screen 20 carried by the second or intermediate shoe 17 supported at the upper ends by the oscillating arms or hangers 13. At a suitable distance in advance of the said hangers 13 the said shoe 17 is supported on the upper or crank ends 21 of a pair of horizontally disposed rocker arms 22, one at each side of the machine, the front ends of which each have an elongated slot 23 that receives the wrist or crank pin 24 on the sprocket drive gear 25 on the fan carrying shaft 26, it being understood that as the sprocket is rotated, in the manner presently explained, oscillatory motion is imparted to the arm 22 and a longitudinal swing is imparted to the second shoe and through the connections between the said shoe, and the upper shoe rockable and longitudinal reciprocation is imparted to the said upper shoe, to thereby provide for a positive separation of the seed from the chaff.

In the practical operation of my improved machine, the grain is discharged from the upper shoe onto the screen of the middle or second shoe over which the larger grains pass into a trough 27 that extends transversely of the machine and empties into a measure 28. The smaller grains pass through the second shoe screen into a receiver 29 pendent from the delivery end of the said second screen which in turn delivers the said smaller grain onto a chute 30 that directs the said smaller grain onto the upper one 31, of a pair of screens carried by the lowermost or bottom shoe 32.

34 designates a regulating valve or gate that is located within the receiver 29 and is so mounted that it may be readily turned by a thumb screw 33 (see Fig. 1) so it can be set to regulate the flow of the smaller grains onto the chute 30 that leads the grain into the upper screen 31 of the bottom shoe 32, as is clearly shown in Fig. 2, of the drawing. The gate or valve 34 also acts as a blast retarder to prevent blowing out the smaller seed with the chaff separated therefrom as the said seed or grain passes from the second to the third or bottom shoe.

The bottom shoe carries an upper screen 31 and a lower screen 35 and the meshes of the said screen are such that coarser seed is deflected on the discharge end of the screen 31 to tail off to one side of the machine. The grain that separates through the upper screen drops onto the smaller or last screen, where it is again separated, the larger tailing off at the other side of the machine which the finer grain passes down onto the closed bottom 36 and slides out through a discharge 37 into a suitable receptacle.

The lowermost shoe 32 is pivotally hung on front and rear sets of hangers 37ª—38, the upper ends of which are pivotally hung on the horizontal brace bars 4 of the main frame.

39 designates a vibrator arm that is pivotally connected at its lower end to a bracket 40 on one side of the lower shoe frame and at its upper end is connected to the wrist pin on the fan shaft gear before referred to. Bracket 40 has a plurality of apertures 41 for adjustably connecting the vibrator arm to accommodate the shift of the upper end connected to the wrist pin 21 on the drive gear 23.

The fan casing 42 includes a forwardly extended blast chamber 43 in which is located a blast valve 44 adjusted by a set screw 46 that projects to one side of the frame (see Fig. 1). The opposite side members of the chute chamber 43 have diagonally extended notch-like slots 45 in their outer ends through which pass the headed ends 46ª of clamp bolts 47 controlled from the outside of the machine by winged nuts 48, as is clearly shown in Fig. 1.

By reason of mounting the discharging end of the blast casing, the said front end may be readily raised or lowered with respect to the chute 30 and its regulating valve 34 to thereby the more perfectly control the force of the blast from the fan directed against the droppings as they pass from the chute 30 onto the top screen of the lowermost shoe.

To provide for increasing or diminishing the force of the fan 50 the bearings for the fan shaft are made longitudinally adjustable (see Fig. 5) it being understood that by moving the shaft farther toward one end of the fan drum or casing the more effective becomes the action of the blades as they move in closer proximity to the wall of the casing.

What I claim is:

1. In a machine of the character stated, the combination with the supporting frame, the hopper, the upper chaff shoe and a bottom screening shoe; an intermediate screening shoe, a receiver into which the larger grains and chaff from the intermediate shoe pass and which discharges laterally of the machine, a blast fan located between the intermediate and the lower shoe, a casing for the fan having a forwardly extended air chamber, a spout pendent from the end of the intermediate shoe, a chute that leads the droppings from the spout on to the lower shoe and means for raising and lowering the discharging end of the blast chamber relatively to the discharge spout from the intermediate shoe.

2. In a machine of the character stated, the combination with the supporting frame, the hopper, the upper chaff shoe and a bottom screening shoe; an intermediate screening shoe, a receiver into which the larger grains and chaff from the intermediate shoe pass and which discharge laterally of the machine, a blast fan located between the intermediate and the lower shoe, a casing for the fan having a forwardly extended air chamber the spout pendent from the end of the intermediate shoe, a chute that leads the droppings from the spout on to the lower shoe and means for raising and lowering the discharging end of the blast chamber, relative to the discharge spout from the intermediate shoe, a valve located in the said spout and a wind valve located in the charging end of the air chamber of the fan casing.

3. In a machine of the character described, the combination with the main framing, the upper screening shoes, and a lower screening shoe, the blast fan, a casing therefor, bearings for the blast fan longitudinally adjustable on the main frame, the ends of the blast fan having driven gears each provided with a wrist pin rockable lever arms connecting the said wrist pins with the upper screening shoes the said lever arms being slotted for receiving the wrist pins the lower screening shoe being pivotally supported on hangers pivotally hung from the main frame and lever connections joining the wrist pins on the fan shaft and pivotally connected with the sides of the lower screen, all being arranged substantially as shown and described.

JAMES C. BENSON.

Witnesses:
A. BRYAN,
JAS. G. BULL.

---

Copies of this patent may be obtained for five cents each, by addressing the "Commissioner of Patents, Washington, D. C."